United States Patent [19]
Carter et al.

[11] Patent Number: 4,586,684
[45] Date of Patent: May 6, 1986

[54] AIRCRAFT LOADING APPARATUS

[75] Inventors: William Carter; Gary Carpenter, both of Jamestown, N. Dak.

[73] Assignee: Western Gear Corporation, Jamestown, N. Dak.

[21] Appl. No.: 528,488

[22] Filed: Sep. 1, 1983

[51] Int. Cl.$^4$ .............................................. B64D 9/00
[52] U.S. Cl. ................... 244/137 R; 187/27; 414/540; 182/148
[58] Field of Search .................. 244/137 R, 118.1; 414/540–545, 486, 471; 182/148, 141–145; 187/8.59, 27

[56] References Cited

U.S. PATENT DOCUMENTS

| 536,215 | 3/1895 | Longauer | 187/27 |
|---|---|---|---|
| 2,701,068 | 2/1955 | Douglas et al. | 214/75 |
| 2,702,678 | 2/1955 | Flock, Jr. | 414/540 |
| 2,950,073 | 9/1960 | McLain et al. | 244/137 |
| 3,416,677 | 12/1968 | Abfalter | 414/545 |
| 3,463,334 | 9/1969 | Blakley et al. | 214/75 |
| 3,478,904 | 11/1969 | Courter | 214/75 |
| 3,552,587 | 1/1971 | Warren | 214/75 |
| 3,661,415 | 5/1972 | Piasecki | 294/81 R |
| 3,776,492 | 12/1973 | Iben | 244/137 R |
| 3,861,542 | 1/1975 | Mölter et al. | 214/75 G |
| 3,885,685 | 5/1975 | Montgomery et al. | 214/38 BB |
| 3,944,087 | 3/1976 | Mölter et al. | 214/75 R |
| 3,952,974 | 4/1976 | Lang | 244/137 R |
| 3,972,427 | 9/1976 | Stanley et al. | 214/38 BA |
| 4,083,429 | 4/1978 | Abbott | 414/541 |

Primary Examiner—Galen L. Barefoot

[57] ABSTRACT

An on-board aircraft loading apparatus including an improved cargo platform and a simplified suspension frame therefor and improved hoist means for lifting and lowering the cargo platform with respect to the suspension frame.

8 Claims, 4 Drawing Figures

AIRCRAFT LOADING APPARATUS

BACKGROUND OF THE INVENTION

There are known various types of loading apparatus for loading and unloading of cargo in an aircraft. Known loading apparatus has commonly included a structural base or frame which is supported with respect to the aircraft cargo door by either the ground, the aircraft itself or by both. A cargo platform or cargo container carrier typically is provided and an elevation means is associated with the structural base and the cargo platform to move the cargo platform between the ground and an elevated position adjacent the aircraft cargo hold floor.

The various known loading apparatus often are of specialized design and application owing to the wide variety of existing aircraft designs. For example, some aircraft are loaded and unloaded through a nose door whereas others are provided with side cargo doors. Each of these and other cargo loading arrangements may require specialized loading apparatus.

Often prior aircraft loaders have been intended to be carried by the aircraft and deployed therefrom for loading and unloading of cargo. This has been desirable as a given aircraft often may be receiving or discharging cargo at a location where no suitable loading and unloading equipment is available. This may be particularly true in the operations of military aircraft, for example.

The prior art is replete with examples of known aircraft loaders, of which the following are exemplary. U.S. Pat. Nos. 3,885,685 and 3,972,427 disclose front-end or nose loading apparatus which are at least partially supported in the operative position by the ground. U.S. Pat. Nos. 2,701,068, 3,478,904, 3,776,492, 3,861,542 and 3,944,087 disclose various loading apparatus in which a cargo platform, typically a cantilevered platform, rides between ground level and the aircraft cargo floor on rails which are deployed from the aircraft to an operative position. U.S. Pat. Nos. 2,950,073, 3,463,334, 3,552,587 and 3,952,974 all disclose loaders which are carried by an aircraft and which include a containerized cargo carrier or a cargo platform suspended from a support frame that is in turn supported by the aircraft adjacent the cargo door. Of these patents, U.S. Pat. Nos. 3,463,334 and 3,552,587, disclose suspension frames which are deployed from the aircraft adjacent the uppermost extent of the cargo door by being rolled laterally outward of the cargo door on tracks from a stowed position within the aircraft. U.S. Pat. No. 2,950,073 discloses a frame including a pair of cantilevered arms which are located to extend laterally outward from the threshold of the aircraft cargo door. U.S. Pat. No. 3,952,974 discloses a cargo platform which is suspended by chains from a cargo door of an aircraft, the chains being passed over drive sprockets which are connected to a sprocket drive system for lifting the platform along vertical tracks which are deployed from the aircraft. U.S. Pat. No. 3,661,415 discloses a cable winching system for hoisting a cargo platform or container with respect to an overhead support of indeterminate structure.

The prior art of aircraft loading apparatus as typified by the above has been subject to certain shortcomings. For example, in those prior loaders incorporating a cargo platform suspended by plural cables from a suspension frame, each cable may be passed about a series of guide pulleys and reeved on the drum of a powered hoist. The guide pulleys, and in some cases the hoist, typically are supported in part by the overhead suspension frame from which the cargo platform is suspended. The suspension frame therefore must be of sufficient strength to support the large tension loads in each run of cable passing between each pair of adjacent guide pulleys. As a result, prior suspension frames have often been of significantly greater weight and design complexity than would otherwise be required merely to support the hanging weight of the cargo platform and its cargo. Related shortcomings have included adverse impact on operational simplicity, reliability, and structural economy. In the case of onboard loaders, aircraft payload has also been adversely affected to the extent that the loader weight or space requirements are not minimized. Other shortcomings of prior loaders include unduly complex mechanical arrangements for storage thereof in and deployment from the aircraft.

Another shortcoming of prior loaders concerns the structural configuration of the suspension frames utilized in suspension type on-board loaders. Many such prior loaders have included a suspension frame located adjacent the top of the aircraft cargo hold door, that is, spaced upwardly form the cargo hold floor, because in the process of lifting the platform and the cargo carried thereby the suspension frame structure was apt to interfere with the cargo. Thus, the suspension frame was spaced upwardly from the elevation of the cargo hold floor in order to ensure that a loaded cargo platform could be lifted up to the cargo hold floor without interference with the suspension frame. The run of suspension cable between the frame and the platform thus is considerably longer than desirable and as a result the suspended platform may be less stabile than desired. Auxiliary structural elements may be required in such systems to stabilize the cargo platform, but this sort of expedient represents a distinct departure from integrated system design practice and results in undesirable additional weight and consequent aircraft payload penalty.

BRIEF SUMMARY OF THE INVENTION

In one preferred embodiment the present invention provides an improved and simplified aircraft loader apparatus of the on-board type wherein a suspension frame is supported by the aircraft adjacent the base of the cargo door for selective deployment from a stowed position within the aircraft to an operational position whereat the suspension frame extends laterally outward from the aircraft at approximately the elevation of the cargo hold floor. A cargo platform is suspended by plural flexible cables from the suspension frame and the plural cables are reeved upon a common drum of a powered hoist or winch which is carried by the cargo platform for lifting and lowering the cargo platform with respect to the suspension frame. All of the guide pulleys over which the cables pass are also carried by the cargo platform.

The minimum structural design requirements of the cargo platform are dictated primarily by the maximum cargo weight to be supported by the platform. The platform is thus of rather heavy duty design, and the additional structural requirements dictated by inclusion therein of the cable hoist system therefore are minimal. By contrast, in the suspension frame the elimination of cable pulley and hoist support elements greatly simplifies suspension frame structure and reduces its mechanical strength requirements as the frame need support only the weight of the cargo platform during loader deployment and stowing, and only the vertical hanging weight of the cargo platform plus its maximum load during cargo loading and unloading operations. Accordingly, the relatively complex loading imposed by the passing of highly tensioned hoist cables about guide pulleys and the hoist drum is supported by the cargo platform which of necessity has commonly been one of the heavier duty components in the system whereas the suspension frame is required only to support the maximum cargo load vertical hanging weight and is therefore of far simpler and more economical design than would otherwise be attainable.

The suspension frame is thus of simplified structural design, preferably taking the form of a closed polygon. This simple, sturdy suspension frame configuration permits the cargo on a properly loaded cargo platform to be passed without interference, through the open interior of the polygonal frame as it is raised to the elevation of the cargo hold floor. Accordingly, the suspension frame may be located adjacent the elevation of the cargo hold floor to thereby minimize the length of the cables by which the platform is suspended with consequent improvement in platform stability. Furthermore, in the elevated position, the cargo platform resides closely subjacent the suspension frame and in mating relationship therewith for convenient transfer of cargo between the platform and the aircraft cargo hold, and for convenient moving of the loader assembly between the deployed and stowed positions. The overall structural improvement in the present invention also provides benefits in operational reliability, weight and material economy, compactness and net aircraft payload increases.

It is therefore a primary object of the invention to provide an improved and simplified on-board type aircraft loader.

Another object of the invention is to provide an on-board loader wherein an improved structural configuration permits component design criteria to be more directly related to the basic functional purposes of the respective components.

Another more specific object of the invention is to provide a loader apparatus including a flexible cable cargo platform hoist system wherein the hoist system is carried by the cargo platform to be hoisted thereby.

Yet another object of the invention is to provide an overhead suspension type loader wherein the length of suspension cable between the suspension frame and the cargo platform is minimized.

These and other objects of the invention will be more clearly understood upon consideration of the following description and the accompanying figures, in which.

Figure 1:
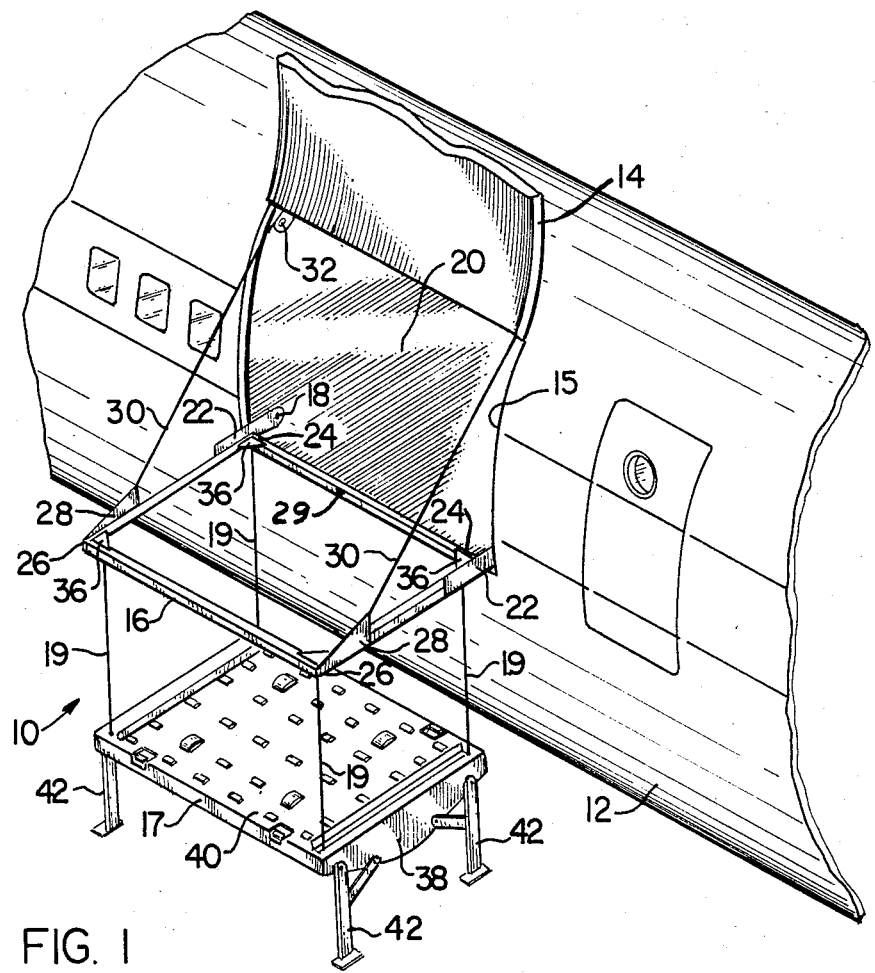
FIG. 1 is a perspective view of a fragmentary portion of an aircraft including a loader apparatus of the present invention shown in its deployed or operational position.

There is generally indicated at 10 in FIG. 1 an on-board loader according to one presently preferred embodiment of the instant invention and which is carried by an aircraft 12 adjacent a cargo door opening 15 for selective deployment between an operative position (FIG. 1) for loading and unloading of cargo to and from aircraft 12 and a stowed position (FIG. 4) inside the closed cargo door 14 where the loader 10 is stowed when not in use.

Figure 4:
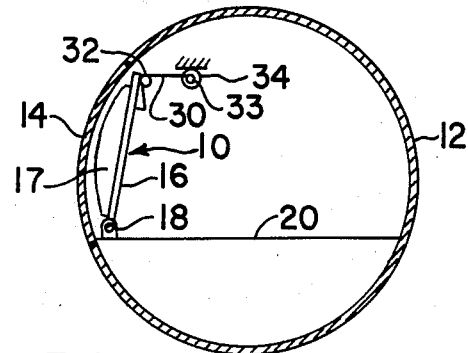
FIG. 4 is a simplified cross section of the aircraft of FIG. 1 showing the loader in its stowed position.

In its preferred form loader 10 comprises a rigid, generally rectangular suspension frame 16, a generally rectangular cargo platform 17 and flexible cables 19 which cooperate with a cable hoist system 52 carried by platform 17 (FIG. 2) to move the platform 17 vertically between the ground and the cargo door opening 15 as hereinbelow described. Frame 16 is pivotally affixed adjacent the threshold of cargo door opening 15 as by pivot connections 18 fixedly secured to the cargo hold floor 20. Pivot connections 18 pivotally engage pivot arm extensions 22 which extend therefrom and are secured with respect to the two adjacent inner corners 24 of frame 16. The two outer corners 26 of frame 16 are provided with cable securing elements 28 which receive and retain flexible frame supporting cables 30. The cables 30 pass from outer corners 26 over guide pulleys 32 fixedly located adjacent the top of cargo door opening 15 and generally vertically above pivots 18, and thence to respective drums 33 of a powered hoist or winch means 34 (FIG. 4). Accordingly, by operation of winch 34 to wind cables 30 upon the winch drums 33 loader 10 may be pivoted upwardly and inwardly about pivots 18 from its deployed position to its stowed position within the aircraft 12. Likewise, by playing out cables 30 from winch 34 loader 10 may be pivoted downwardly and outwardly about pivots 18 from its stowed position to its deployed position whereat it extends laterally outward from cargo door opening 15.

In the deployed position frame 16 is secured adjacent inner corners 24 by pivots 18 and is suspended adjacent outer corners 26 by the diagonally extending cables 30.

Frame 16 may be constructed of such suitable structural elements as, for example, lengths of square section tube or angle stock secured together at their ends as by welding to form the frame 16 and corner gussets 36 welded to the corners 24, 26 to resist shear deformation in the plane of the frame 16.

Adjacent each corner 24, 26 of frame 16 there is fixedly secured the uppermost end of one of the four cables 19, the cables 19 passing vertically downward therefrom and each engaging rectangular platform 17 adjacent a respective corner thereof for suspension of platform 17 beneath frame 16 in the operative orientation shown in FIG. 1.

Platform 17 comprises a generally box-like rigid structural body assembly 38 which presents a rectangular, upwardly facing cargo support surface 40 of dimensions corresponding generally to those of frame 16. Platform 17 is also provided with pivotally collapsible legs 42 for ground support thereof when the platform 17 is lowered to the ground, idler load transfer rollers 44 which protrude above surface 40 to ease transfer of cargo to and from platform 17, four powered transfer rollers 46 which protrude above surface 40 for powered cargo transfer to and from platform 17, edge guides 48 for guiding cargo in transfer thereof to and from platform 17, and load stops 50 which may be selectively positioned to prevent movement of a cargo load on the platform beyond predetermined limits generally corresponding to the inner and outer edges of surface 40.

The edge guides 48 and load stops 50 define cargo load size limits which ensure that the cargo carried on surface 40 within a space extending vertically upward from the described limits will pass through the open center of frame 16 upon hoisting of platform 17 from the ground to cargo hold floor 20. This permits the platform to be elevated from the ground to a position directly adjacent to frame 16 without any interference with the cargo carried thereby and, in turn, permits the frame 16 to be located adjacent the threshold of cargo door opening 15 (i.e. at the level of cargo hold floor 20). Accordingly, when the cargo platform 17 is elevated and surface 40 is aligned with cargo hold floor 20, the length of suspension cables 19 between frame 16 and platform 17 is minimal. This minimizes the potential for platform swinging and other relative lateral movement between frame 16 and platform 17.

It is to be noted that when frame 16 is deployed one frame member 29, which extends adjacent the threshold of cargo door opening 15, is located slightly below the elevation of floor 20 and also slightly below the elevation of the plane of travel of cargo riding on rollers 44,46 during cargo transfer between surface 40 and floor 20. Accordingly, member 29 will not interfere with such cargo transfer as the cargo will normally pass thereover.

Figure 2:
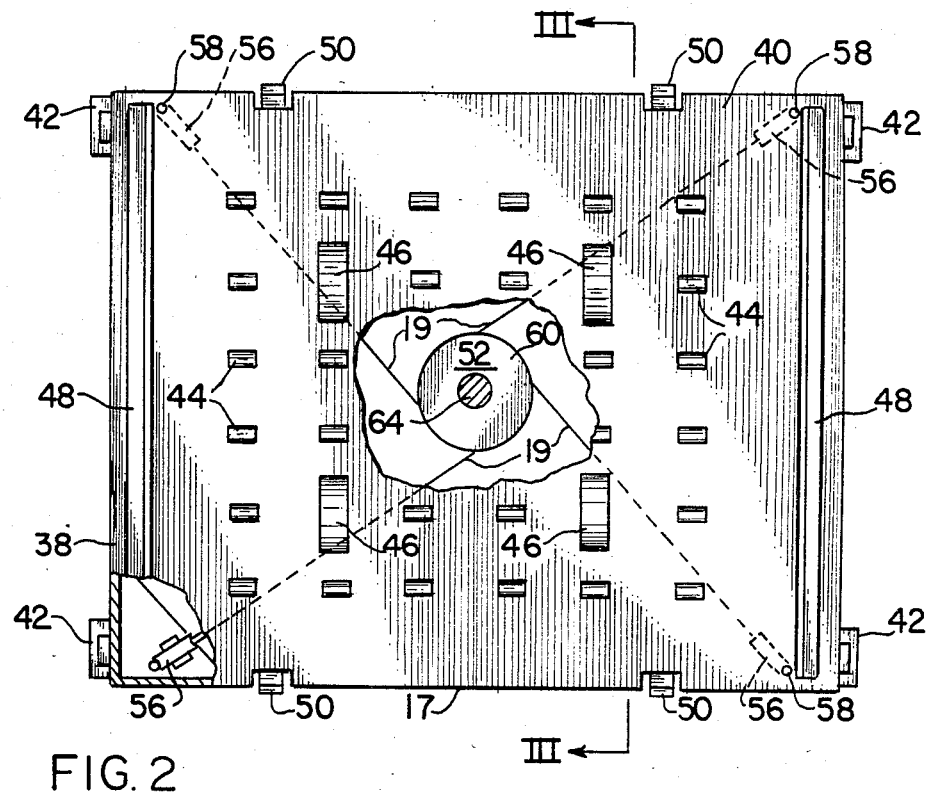
FIG. 2 is a plan view, partially broken away, of the loader cargo platform of this invention.
Figure 3:
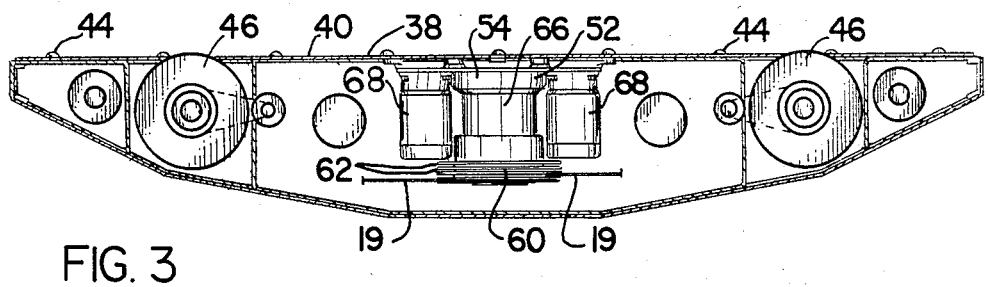
FIG. 3 is a sectional view taken on line III-III of FIG. 2.

Referring to FIGS. 2 and 3, the platform body 38 includes cable hoist system 52 which is comprised of a hoist assembly 54 rigidly affixed generally centrally within body 38 and four idler pulleys 56, one fixedly secured adjacent each corner of surface 40 within body 38. In hoist assembly 54, drum 60 is mounted upon a rotary output axle 64 of a transmission 66 which is driven by one or more suitable drive motors 68.

Each pulley 56 is oriented diagonally with respect to the rectangular form of surface 40 such that one of cables 19 may be passed downwardly through a respective aperture 58 in surface 40, about the respective pulley 56 and diagonally to the drum 60 of hoist assembly 54. The four cables 19 all are reeved upon a common drum 60 for uniform cable take up and play out during hoist operation. Preferably, drum 60 includes a set of four identical, circumferentially extending cable receiving grooves 62, one for each cable 19, and the cables 19 are suitably secured so as to be guided in the respective grooves 62 during hoist operation to ensure the desired uniform cable take up and playout.

During cable take up by hoist 54, platform 17 is elevated from the ground to a position directly subjacent frame 16 whereat surface 40 is generally coplanar with cargo hold floor 20 and the length of cables 19 between frame 16 and platform 17 is minimal. During cable playout the platform 17 is lowered vertically from the elevated position toward the ground. Accordingly, by repetitive selective operation of hoist 54 the loader may be readily utilized for transfer of cargo between the aircraft cargo hold and the ground.

To stow the loader 10, hoist 54 is operated to elevate the platform 17 to its uppermost position directly subjacent frame 16. Mechanical latches (not shown) may be provided as desired to securely latch platform 17 to frame 16, and legs 42 are collapsed so as to reside closely adjacent the respective ends of body 38. The entire loader 10 may then be pivoted upwardly and inwardly about pivots 18 by operation of winch 34 to take up cables 30 upon drums 33 until the loader 10 resides in its generally upright stowed position within the cargo hold of the aircraft 12 and clear of door 14 as shown in FIG. 4.

According to the description hereinabove there is provided by the instant invention an on-board aircraft loader offering advantageous design, material economy, operational stability, service reliability, compactness, and ease of operation with attendent benefits in increased aircraft cargo payloads and reduced transport cost per payload unit. In the described preferred embodiment the loader of this invention includes a suspension frame located adjacent the threshold of an aircraft cargo door generally adjacent the elevation of the cargo hold floor. A cargo platform suspended by cables from the suspension frame is movable vertically upward and downward with respect to the frame by a hoist which is carried within the cargo platform body and is selectively operable to take up or play out the suspension cables. The cargo platform hoist system is contained within the cargo platform which is a relatively heavy duty assembly thus permitting the application of considerable design economy in the suspension frame without imposing any undue limitations on the gross cargo weight transfer capability of the loader.

The preferred embodiment provides for suspension of the cargo platform and its load by means of a four-corner arrangement of flexible cables wherein the tension load imposed on the four cable runs is substantially identical and uniform during operation, depending only upon the weight of the cargo load on the platform. Furthermore, the cable take up and playout is completely uniform whereby the suspended platform provides a stabile cargo transfer base.

Such preferred embodiment of the invention having been described hereinabove, it is to be appreciated that various alternative and modified embodiments of the invention are contemplated. For example the specific arrangement of hoist cables extending between the suspension frame and the cargo platform, as well as within the cargo platform, may be other than that described. The means for pivoting and supporting frame 16 may be other than cables 30; for example hydraulic cylinder assemblies might be one alternative although this and some other potential alternatives would impose a weight penalty on the loader design. Additionally, platform 17 could conceivably be a lifting frame for containerized cargo.

These and other embodiments having been envisioned and anticipated by the inventors, it is intended that the invention be construed broadly and limited only by the scope of the claims appended hereto.

We claim:

1. An on-board loader for transporting cargo from ground facilities up to the cargo doorway of an aircraft whereat said cargo is moved into the aircraft, comprising:

an open interior suspension frame having one portion thereof connected to such an aircraft inwardly adjacent such a cargo doorway, means carried by such an aircraft and connected to a portion of said frame spaced laterally from said one portion for selectively positioning said frame in a stored position within such an aircraft or in a generally horizontal position outwardly of such a doorway, a cargo carrying platform, selectively actuable means cooperable with said platform and said frame for supporting said platform for bodily movement with said frame when said frame moves between and into said stored and horizontal positions, said platform having an upwardly facing surface when said frame is in said horizontal position, and said actuable means being selectively actutable to lower and raise said platform with respect to said frame when said frame is in said horizontal position, and said platform having, when said frame is in said horizontal position, a cargo supporting portion defining an uppermost surface selectively movable through the open interior of said frame and located above at least the side of said frame locatable outwardly adjacent such a doorway.

2. An on-board loader as set forth in claim 1 wherein said means comprises flexible cables connected to said portion of said frame and hoist means connectable to such an aircraft for selectively reeling and unreeling said cables.

3. An on-board loader as set forth in claim 1 wherein said one portion of said frame is pivotably connected to such an aircraft.

4. An on-board loader as set forth in claim 1 wherein said cargo supporting portion consists of a plurality of rollers.

5. An on-board loader as set forth in claim 1 wherein said platform actuating means includes flexible cables connected to said frame.

6. An on-board loader as set forth in claim 5 wherein said actuating means includes a selectively rotatable drum which upon actuation, simultaneously winds said cables to raise said platform and simultaneously unwinds said cables to lower said platform.

7. An on-board loader as set forth in claim 6 wherein said drum is carried by said platform.

8. An on-board loader as set forth in claim 6 wherein said drum is carried on the underside of said platform.

* * * * *